United States Patent

[11] 3,621,894

| | | |
|---|---|---|
| [72] | Inventor | Eugene J. Niksich<br>Rego Park, N.Y. |
| [21] | Appl. No. | 872,526 |
| [22] | Filed | Oct. 30, 1969 |
| [45] | Patented | Nov. 23, 1971 |
| [73] | Assignee | U. S. Plywood-Champion Papers, Inc.<br>New York, N.Y. |

[54] SPIRAL BAND SAW
9 Claims, 8 Drawing Figs.

[52] U.S. Cl. ................................................ 143/21 A,
143/133 D, 83/201, 143/19 E, 83/201.15
[51] Int. Cl. .............................................. B27b 13/10
[50] Field of Search ......................................... 143/19, 19
E, 17, 21, 21 A, 21 B, 133 D; 83/201

[56] References Cited
UNITED STATES PATENTS

| 340,964 | 4/1886 | Thomas .................... | 143/21 A X |
| 2,604,910 | 7/1952 | Crosby .................... | 143/19 E |
| 2,690,774 | 10/1954 | Hoard ........................ | 143/21 |

FOREIGN PATENTS

| 439,697 | 9/1948 | Italy .......................... | 143/21 A |

Primary Examiner—Donald R. Schran
Attorneys—James M. Heilman and Heilman & Heilman ABSTRACT: A spiral blade saw which may be used as a hand or bench model and comprising drive means for carrying the blade wherein all turns of the path of movement of the blade are at least at a predetermined minimum turning radius.

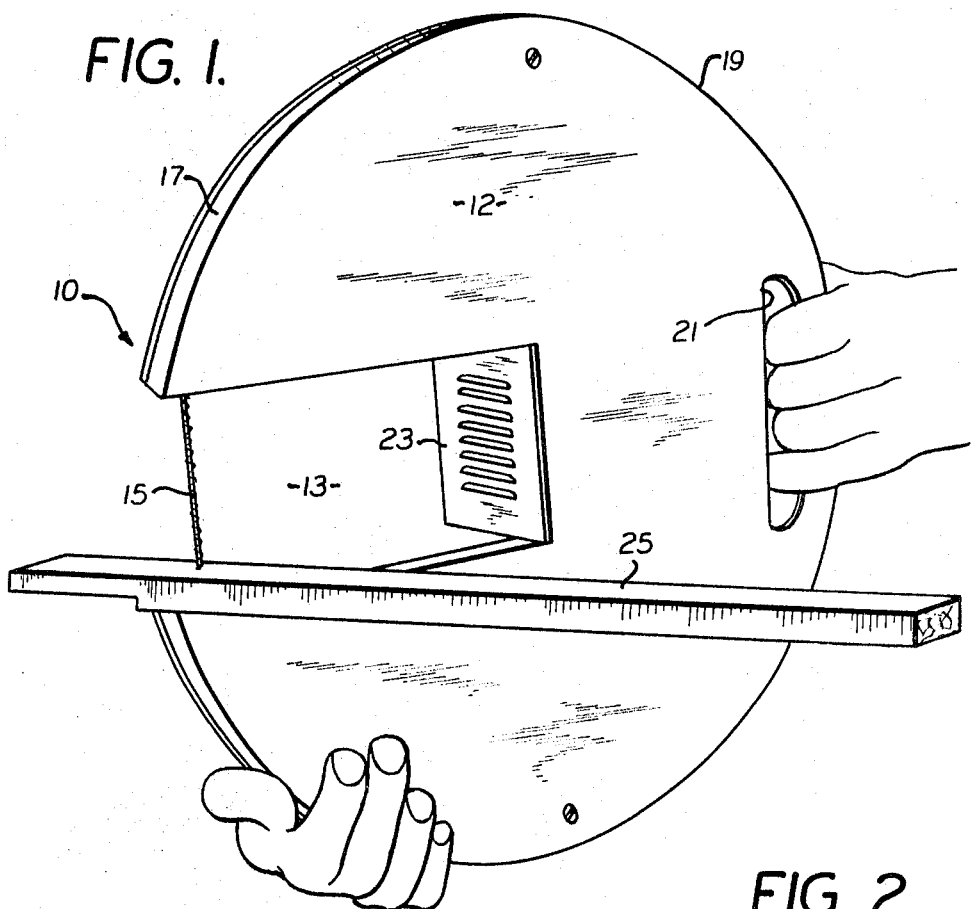
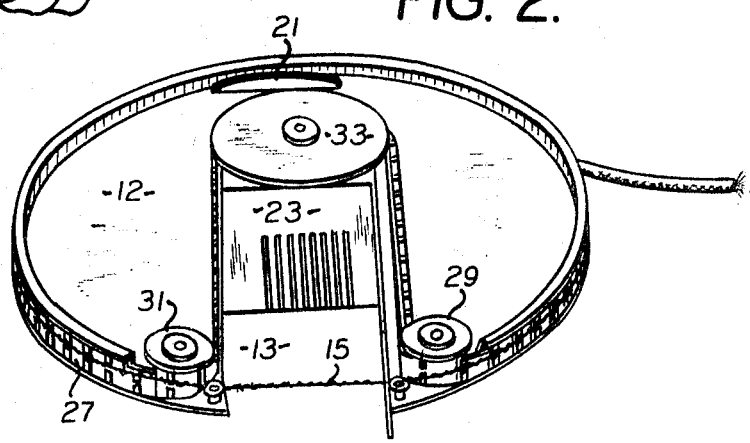
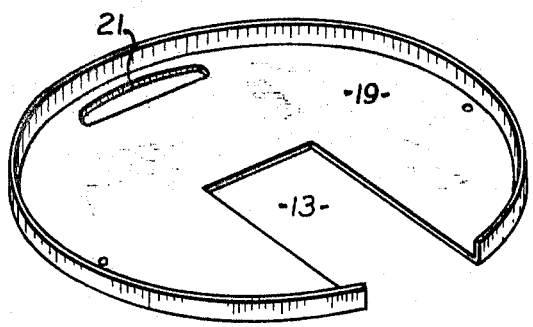
PATENTED NOV 23 1971
3,621,894
SHEET 1 OF 3
FIG. 1.
FIG. 2.
FIG. 3.
INVENTOR
EUGENE J. NIKSICH
BY James M. Heilman
ATTORNEY.

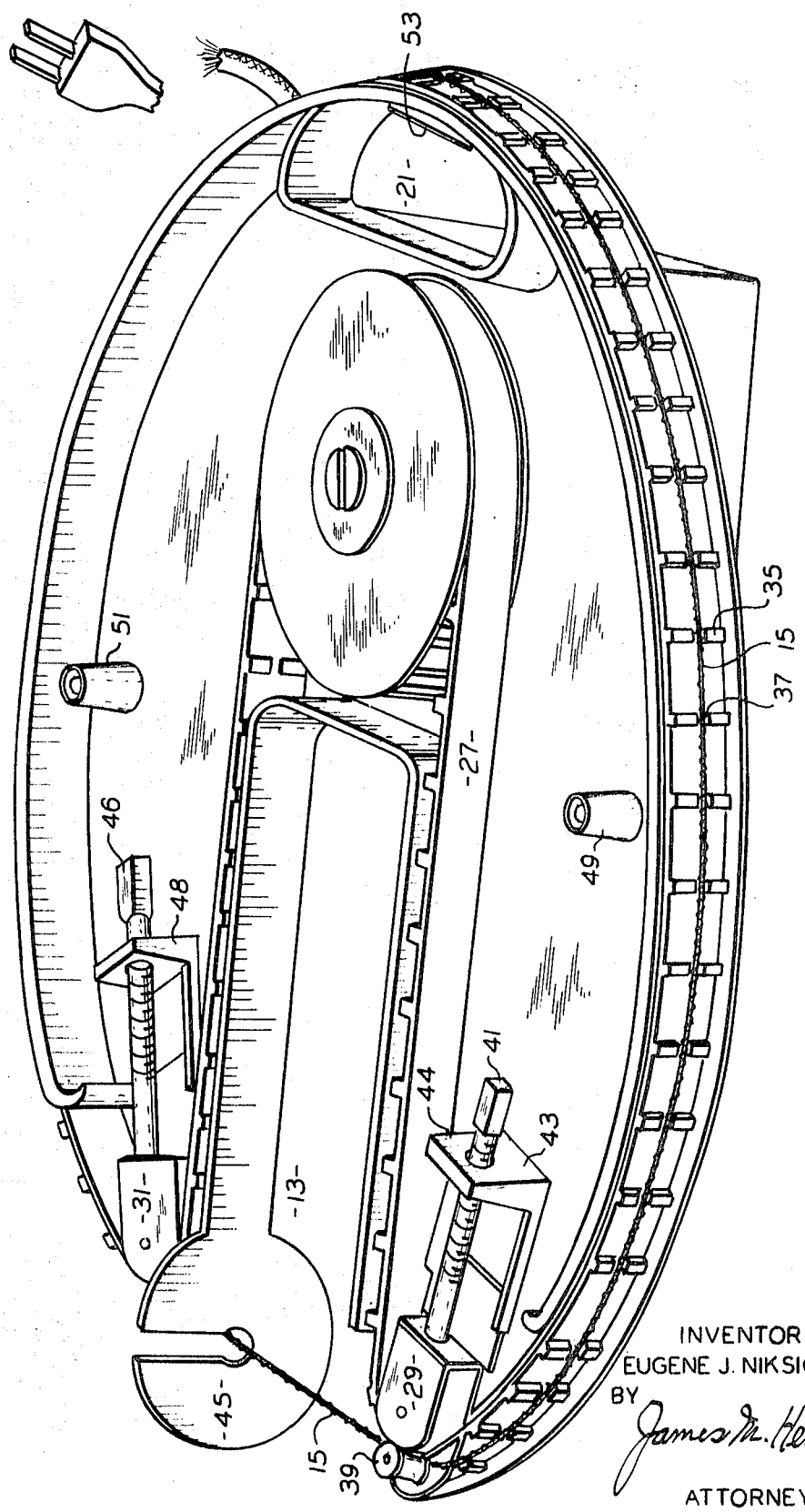

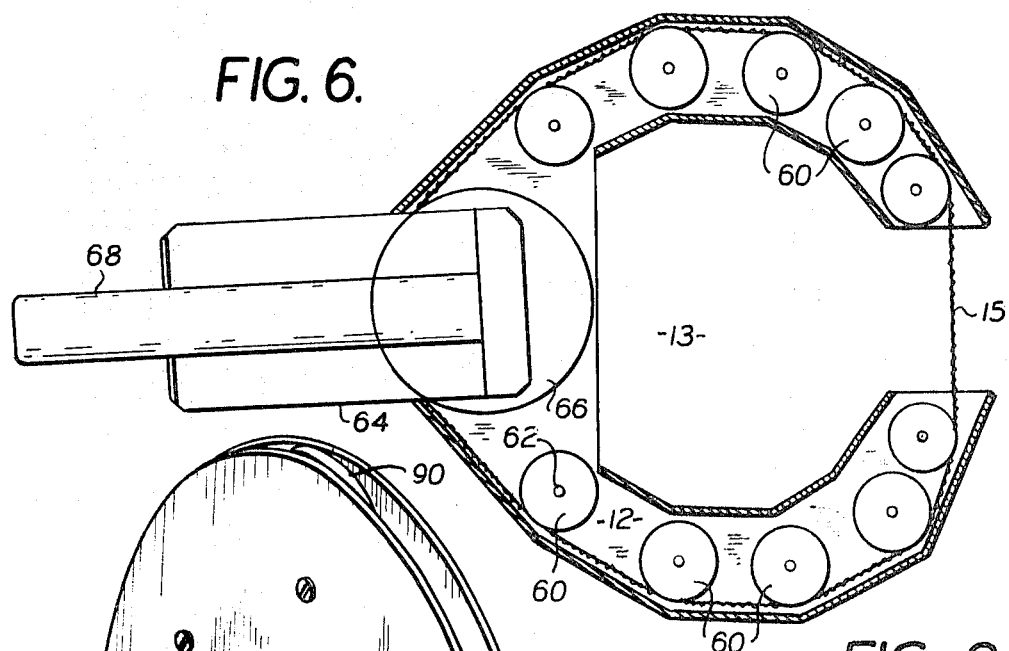
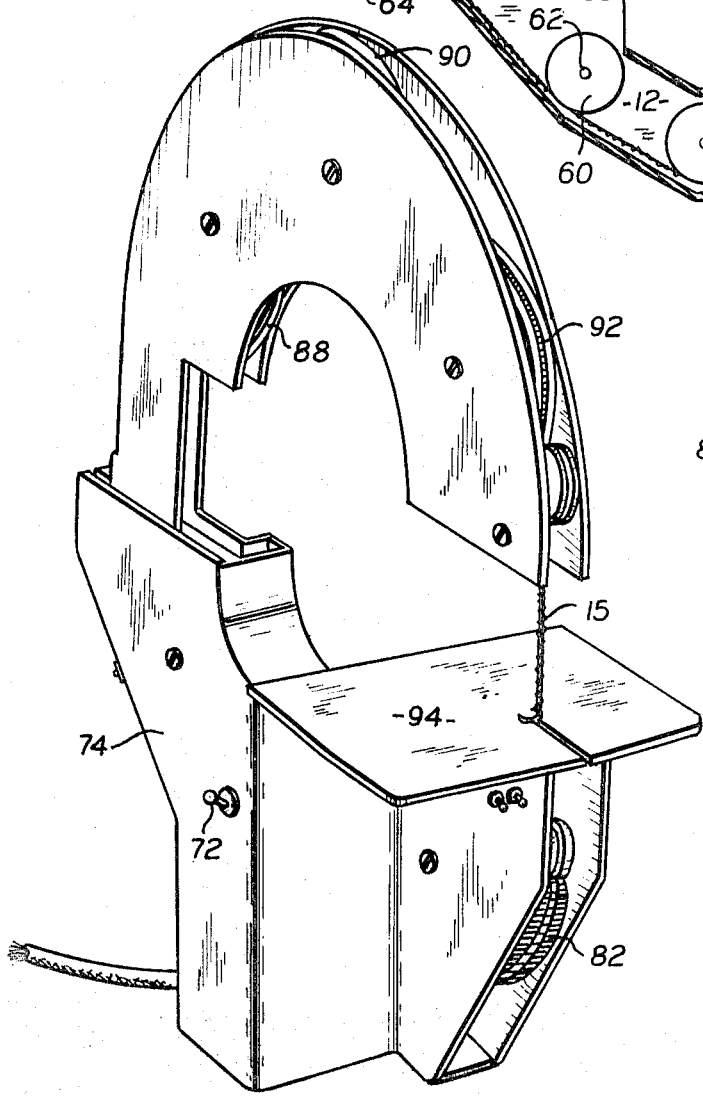
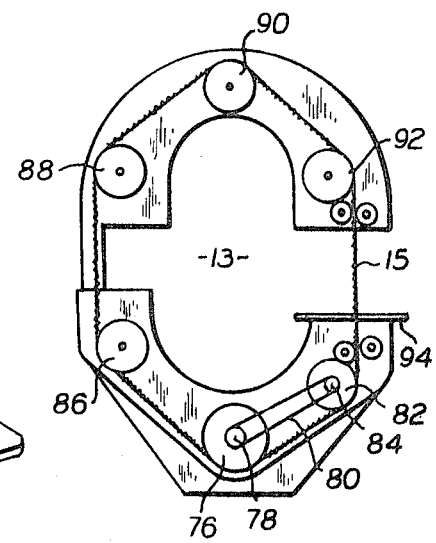
INVENTOR
EUGENE J. NIKSICH
BY *James M. Heilman*
ATTORNEY.

SPIRAL BAND SAW

BACKGROUND OF THE INVENTION

This invention relates to a spiral blade saw, and, more particularly, to a portable spiral blade saw.

Spiral blades are commonly used for industrial operations in precision cutting of wood, aluminum, steel, copper, brass, leather, plastics, jewelry items, and almost every other type of material. The spiral blade has many advantages because all edges of the blade are cutting edges and saws in all directions without having to turn the work piece. Further, the blade cuts without chipping or tearing thus leaving very smooth edges.

As may be readily understood, such a versatile saw is widely used in industry. Further it has become increasingly apparent to the lumber industry that extra thin saws increase the lumber yield. The spiral blade saw is relatively thin, and thus, in accordance with the recent findings of the lumber industry, increases the effective lumber yield.

The spiral blade has never been adapted to be used with a portable tool, due to the fact that the blade is welded together and easily breaks. Often the weld point breaks when the blade is bent over a small wheel guiding its movement.

Presently, the smallest machine utilizing spiral blades comprises two large wheels each 14 inches in diameter and with the blade loop being over five feet. Clearly, this type of spiral blade saw is not capable of being portable. In the prior art, when the path of movement of the blade has included a turning radius of under seven inches, the blade has failed. It may readily be understood that although it is apparent that the blade would be widely used if a smaller version were developed, the prior art has failed to provide such a saw.

An object of the present invention is to provide a portable spiral blade saw. Another object of the present invention is to provide a spiral blade saw capable of being hand held. Still another object of the present invention is to provide a portable spiral blade saw capable of being used as a bench model.

Another object of the present invention is to decrease the blade loop travel of a spiral blade used as a saw. Still another object of the present invention is to provide a blade saw which is relatively easy to operate.

Another object of the present invention is to provide a spiral blade saw which is relatively attractive in appearance. Still another object of the present invention is to provide a blade saw which is safe to operate.

Another object of the present invention is to provide a spiral blade saw which is fairly inexpensive to manufacture. Still another object of the present invention is to provide a spiral blade saw which is relatively sturdy.

Another object of the present invention is to provide a spiral blade saw which is relatively reliable in performance. Other objects, advantages and features of the present invention will become more apparent in the following description.

SUMMARY OF THE INVENTION

In accordance with the principles of the present invention, the above objects are accomplished providing a spiral blade saw comprising drive means for carrying the blade wherein all turns of the path of movement of the blade are at least at a predetermined minimum turning radius, the invention comprising means for driving the blade a total path distance of approximately $2\pi$ multiplied by the predetermined radius and means enclosed within the path of travel of the blade capable of enabling a work piece to be moved against the blade. As is well known $\pi$ equals 3.14. The blade is carried around a grooved edge of a C-shaped body with the front portion comprising a mouth section. The blade is moved around the body along the grooved edge and passes across the mouth section of the spiral blade saw.

The mouth section which is enclosed within the path of movement of the blade enables a workpiece to be cut by the blade while being moved into the mouth section. The depth of cut permitted for the workpiece will be almost equal to the depth of the mouth section.

The blade is carried around the grooved edge of the body and, as a safety feature of the present invention, a suitably shaped cover is placed over the edge of the body enclosing the moving blade preventing access to it. The body is preferably C-shaped, as described above, but other shapes for the body may be designed by those of ordinary skill in the art.

As a feature of the present invention, the path of movement of the spiral blade is substantially circular with a minimum effective turning radius never less than that which would cause the spiral blade to snap or break. As described above, this radius is approximately seven inches.

In accordance with the principles of the present invention, a drive wheel drives the blade around a plurality of guide wheels located around the periphery of the body, effectively describing a circular path of motion. The diameter of the guide wheels is generally less than seven inches and, for instance, may be two or four inches. As the blade moves over these wheels, the turning radius is that of the guide wheel. But, since there are a large number of such guide wheels, the length of contact between the blade and each wheel is a minimum thereby minimizing the effect of the smaller turning radius. Essentially, the spiral blade is subjected to a turning radius of approximately no less than seven inches although as each guide wheel is contacted, the specific turning radius there is less than the predetermined minimum. For purposes of this application, the minimum effective turning radius should be considered to be no less than seven inches.

As still another embodiment of the present invention, a drive belt carries the spiral blade in notches of the belt around the body of the spiral blade saw. While the drive belt carries the spiral blade around the periphery of the body, they separate as they approach the mouth section of the saw and join together as the blade leaves the mouth section. In this manner, as the blade crosses the mouth, a workpiece is cut moving it against the exposed saw into the mouth section.

Although, as described above, the body is preferably C-shaped, any other shape may be chosen by those of ordinary skill in the art but, the effective loop of the spiral blade saw should be approximately as described above in order to enable the saw to be portable yet capable of cutting a workpiece.

A through-hole is cut in the body of the saw which becomes the handle for the saw. Further, since the motor is electric, a pushbutton switch is utilized to easily control the motor. The push button is located in the segment of the handle held by the fingers so as to be simply controlled by the operator.

Utilizing the principles of the present invention, it is possible to construct a portable spiral blade saw of approximately 15 inches in diameter. Further, the device is relatively light, sturdy, and effective in cutting almost every conceivable type of material.

Modifications may be made to the spiral blade saw described above in order to utilize it as a bench model. These modifications basically include means to fix the spiral blade of the present invention to a table or bench and guide and cut an appropriate workpiece by passing it across and into the mouth section of the saw. In this model, a more conventional electrical switch is utilized to control the drive motor which causes the blade to move in its relatively circular direction around the body or housing of the saw.

In order to provide a versatility for the spiral blade saw of the present invention, means to adjust the tension are provided which are easily accessible to the operator enabling the tension on the spiral blade saw to be adjusted.

THE FIGURES

FIG. 1 is a perspective view of the portable spiral blade saw of the present invention.

FIG. 2 is a perspective view of one embodiment of the drive mechanism for the portable spiral blade saw of the present invention with the protective cover portion removed therefrom.

FIG. 3 is a perspective view of the protective cover for the spiral blade saw shown in FIGS. 1 and 2.

FIG. 4 is a more detailed perspective view of the drive mechanism for the portable spiral band saw of the present invention.

FIG. 5 is an end view of the groove portion of the outer edge of the body of the saw of the present invention.

FIG. 6 is a top view of the still another embodiment of the drive mechanism of the present invention with the protective cover portion removed therefrom.

FIG. 7 is a perspective front elevation view of a bench model spiral blade saw constructed in accordance with the principles of the present invention.

FIG. 8 is a side elevation view of the bench model shown in FIG. 7 with a portion of the protective cover removed.

DETAILED DESCRIPTION

The spiral blade has many advantages, as cited above. Due to the fact that all edges of the blade cut, it saws in all directions without turning the workpiece. Further, the blade cuts without chipping or tearing and leaves extremely smooth edges. The spiral blade has found wide use in every type of industry from aircraft plants to custom jewelry manufacturers. Unfortunately, though, because of the strength of the weld portion of the spiral blade, its prior use has been limited to large industrial machines.

In accordance with the principles of the present invention, the large turning radius required to prevent the blade's snapping when being used is achieved with the present saw while a depth of cut area is provided within the blade's path of movement.

FIGS. 1 through 4 illustrate one embodiment of the present invention in which a spiral blade is driven around a circle-shaped body and across a mouth section with the depth of the mouth section enabling a suitable depth of cut to be made. The spiral blade saw 10 generally comprises a circle-shaped body 12 having a mouth portion 13. A spiral blade 15 is carried around the outer edge 17 of the spiral band saw and across the front of mouth section 13. A protective cover 19 covers and closes the outer edge around which blade 15 moves in order to prevent access to the moving blade. To enable the portable blade saw to be easily operated and controlled, a through-hole 21 is provided in the rear of body 12 and is capable of being grasped by the operator. A motor 23 is attached to the body 12 and indirectly drives the blade 15. A workpiece 25 is illustratively shown being moved against moving blade 15 and into the mouth portion 13 while being cut.

The spiral blade 15 is carried on a timing belt 27 which moves around the outer edge of body 12. Timing belt 27 is notched and carries spiral blade 15 around the body 12. At one end of the mouth portion 13 the spiral blade 15 is separated from the belt 17 while at the other end of the mouth 13, the blade 15 again joins the belt and is driven by it. A pair of take-off and guide wheels 29 and 31 separate and join the belt 27 from the saw 15, respectively. As the belt approaches one side of the mouth portion 13, it does not move in the general contour of the outer portion of the portable saw 10 but follows the contour of the depth of cut portion defined by mouth portion 13. To that end, the belt is moved around guide wheels 29 and 31, as described above, and around a timing belt drive wheel 33. Timing belt drive wheel 33 located behind the rear portion of the mouth section 13 is adapted to timing belt 27 by engaging it. Timing belt drive wheel 13 is rotated by motor 23 with suitable and well-known drive means connected between the motor and drive wheel 33. In this manner, the belt 27 is driven and carries the spiral blade 15.

FIGS. 4 and 5 present more detailed views of the operative parts of the embodiment shown in FIGS. 1 through 3. The belt 27, preferably, is made of a material which will not stretch and, for instance, may comprise rubber reinforced with steel. Belt 27 comprises a plurality of teeth 35 spaced along its length and projecting away from body 12. A groove 37 is cut into each timing belt tooth to hold and carry the spiral blade 15. As the blade approaches the mouth portion 13, the belt 27 separates from the blade enabling the blade 15 to move across the open front end of mouth portion 13. As the spiral blade moves into the front portion of the mouth section 13, a guide wheel 39 which is part of the belt adjustment mechanism helps to guide the spiral blade across the open end of the mouth portion 13. Guide wheel 29, previously described, freely moves with the belt 27 as it separates from the spiral blade 15.

Guide wheel 29 is attached to a timing belt adjustment mechanism which comprises, in part, a turn screw 41. A base 43 is welded to body 12 and the body of turn screw 41 fits through a hole in a projection 44 of base member 43. One end of turn screw 41 abuts guide wheel 29 and, by manually turning the other end of turn screw 41, the guide wheel is moved to adjust the tension in the blade 15.

As the blade 15 moves across the front of the mouth portion 13, a slotted circle base member 45 which forms a boundary of mouth section 13 and is attached to the body 12 aids in guiding the spiral blade across the front end of mouth section 13. The blade passes through the slot in member 45 as it traverses the mouth. When the blade joins belt 27 after crossing the open end of mouth portion 13, guide wheel 31 causes the belt 27 to contact and carry the spiral blade 15. The position of guide wheel 31 is adjusted by turn screw 46 and base member 48 which are connected and operate in the same manner as turn screw 41 and base member 43 with one end of turn screw 46 abutting guide wheel 31.

The outer edge of body 12 is of a channel-type construction, as seen in FIG. 5, with the belt carried in the channel and around the body. Preferably, the bottom of the channel 50 is coated with a material to minimize the friction between the belt and channel and, for instance, comprises "Teflon." The groove around the outer edge of body 12 is formed by channel 50.

In order to attach the cover section 19 to the remainder of body 12, a pair of threaded projections 49 and 51 are attached to the inner portion of body 12 and receive a threaded screw. A push button type switch 53 is provided at the rear of handle portion 21 in order to easily control the device when in use as a portable saw. The blade is moved when the button is pushed and stopped when released.

In the prior art, it was found that when the spiral blade had a turning radius in its path of motion or loop of less than seven inches, it frequently snapped when a workpiece was being cut. This requirement has limited the use of the spiral blade to large machine in which at least 14 inch diameter drive wheels are utilized. In accordance with the principles of the present invention, the minimum turning radius of 7 inches is effectively achieved as seen in FIGS. 1 through 4 with a portable-type machine. The prior art problem of snapping is effectively eliminated and, the portable power saw of the present invention will find wide use. It should be noted though at the points where the spiral saw 15 and belt 27 separate and again join, the actual turning radius will be slightly less than seven inches. It is to be understood, though, that the effective turning radius for the entire belt is at least seven inches and this small deviation at one specific point has not been found to significantly affect the operation and reliability of the blade. In particular, in repeated use of the blade, as shown and described in this application, the blade has not failed. It is to be understood that the arrangement of parts shown above is not limited to an effective turning radius of 7 inches but could be used where any desired turning radius is required and a portable saw could be beneficially used.

FIG. 6 illustrates still another embodiment of the present invention in which a plurality of guide wheels 60 carry the spiral blade 15 around an effective turning radius of at least seven inches. The guide wheels are located around the periphery of body 12 and are fixed to the body portion 12 of the device and are rotatable about a pivot member 62 located and connected to each guide wheel 60 and to the body 12. A motor 64 is attached to the body portion 12 and directly drives drive wheel 66 which carries and drives the spiral blade around the effectively circular path of travel. As described above with FIGS. 1 through 4, the "effective" turning radius herein is at least seven inches, and it is to be understood that the effective path of travel of the spiral blade, in accordance with the principles of the present invention, is approximately $2\pi$ multiplied by the turning radius. With the embodiment shown in FIG. 6, the minimum turning radius for spiral blade saws is seven inches although other radii may be employed. By providing a C-shaped body 12, a significant cutting depth is provided in the mouth portion 13. A handle 68 attached to body 12, suitable for gripping the portable saw, extends rearwardly from the rear portion of the body 12 and enables the portable saw to be easily manipulated when used.

FIGS. 7 and 8 illustrate still another embodiment of the present invention in which the spiral blade saw is utilized as a bench model. Since the saw may be relatively small with a total loop travel of approximately $14\pi$ inches, the bench model shown in FIGS. 7 and 8 is portable. A switch 72 located on one side of a housing 74 controls a motor 76. A shaft 78 of motor 76 is attached to one end of a pulley 80. The other end of pulley 80 is attached to a drive wheel 82 which is pivoted about pivot 84 which is attached to housing 74. A series of guide wheels 86, 88, 90 and 92 of different diameter are utilized to guide the spiral blade's path of motion in a manner similar to that described above in FIG. 6 with guide wheels 60. A grooved guide plate 94 is located at the bottom of the front end of the mouth section 13 to hold and guide the work piece as it is cut by the moving spiral blade. The groove in guide plate 94 enables the blade to be easily removed when necessary and further aids in guiding the spiral blade as it passes across the front portion of mouth section 13.

The embodiments shown in FIGS. 5–8 have been only briefly described since their operations are somewhat similar to those described in FIGS. 1–4. Further it is believed that these operations may easily be understood with reference to these Figures.

While the above embodiments illustratively describe the principles of the present invention, they should not be construed in a limiting sense but merely as illustrative. Other modifications and embodiments may be devised by those skilled in the art from the teachings described herein, and such modifications and embodiments are to be considered within the scope of protection obtained by this patent application.

From the above description, it is seen that the objects are efficiently attained and that a portable spiral blade saw has been described.

The embodiments of the invention in which an exclusive property or privilege is claimed are defined as follows:

1. A spiral blade saw comprising: a housing having body and mouth sections with said mouth section located within the path of movement of the blade; a spiral blade in the form of an endless wire having cutting edges positioned on all sides, an endless drive belt for carrying the blade, said drive belt formed with a plurality of equally spaced notched teeth which engage the blade, said drive belt also engaging a rotary driving means for moving the belt; and a guide plate mounted adjacent to the periphery of the housing for slidably supporting the drive belt and the blade.

2. A spiral blade saw according to claim 1 wherein the rotary driving means includes a power wheel having teeth on its periphery which engage the teeth on the drive belt.

3. A spiral blade saw according to claim 1 wherein said guide plate has a generally circular shape with a radius of curvature having a predetermined minimum value.

4. A spiral blade saw according to claim 3 wherein the radius of curvature of the guide plate is greater than 7 inches.

5. A spiral blade saw according to claim 1 wherein said mouth section is positioned so that a work piece can be moved against the blade and into the mouth section.

6. A spiral blade saw according to claim 1 wherein said drive belt is mechanically engaged by the guide plate, the driving means, and two guide wheels to separate from the blade at one of the edges of the mouth, directed around the mouth section, and then engaged with the blade at the other end of the mouth section.

7. A spiral blade saw according to claim 1 wherein an opening is formed in said housing to act as a handle to be grasped by an operator.

8. A spiral blade saw according to claim 1 wherein said driving means comprises an electric motor for moving the belt, and a manually operated electric switch attached to said housing.

9. A spiral blade saw according to claim 6 wherein said two guide wheels are adjustable for altering the tension on the drive belt and the blade.

* * * * *

UNITED STATES PATENT OFFICE
CERTIFICATE OF CORRECTION

Patent No. 3,621,894                    Dated   November 23, 1971

Inventor(s)   Eugene J. Niksich

It is certified that error appears in the above-identified patent and that said Letters Patent are hereby corrected as shown below:

Assignee's name should be written as follows:

U.S. Plywood-Champion Papers Inc. - i.e., there is no comma between "Papers" and "Inc."

Signed and sealed this 9th day of May 1972.

(SEAL)
Attest:

EDWARD M.FLETCHER,JR.                ROBERT GOTTSCHALK
Attesting Officer                    Commissioner of Patents